United States Patent
Li et al.

(10) Patent No.: US 11,063,840 B1
(45) Date of Patent: Jul. 13, 2021

(54) METHODS AND SYSTEMS FOR PREDICTING SUCCESSFUL DATA TRANSMISSION DURING MASS COMMUNICATIONS ACROSS COMPUTER NETWORKS FEATURING DISPARATE ENTITIES AND IMBALANCED DATA SETS USING MACHINE LEARNING MODELS

(71) Applicant: THE BANK OF NEW YORK MELLON, New York, NY (US)

(72) Inventors: Weipeng Li, New York, NY (US); Ganesh Rao, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 17/081,741

(22) Filed: Oct. 27, 2020

(51) Int. Cl.
  *H04L 29/02* (2006.01)
  *H04L 12/24* (2006.01)
  *H04L 12/26* (2006.01)

(52) U.S. Cl.
  CPC .............. *H04L 41/16* (2013.01); *H04L 41/22* (2013.01); *H04L 43/08* (2013.01)

(58) Field of Classification Search
  CPC ................................ H04L 41/16; H04L 43/08
  See application file for complete search history.

(56) References Cited

U.S. PATENT DOCUMENTS

2019/0379576 A1* 12/2019 Narnakaje Venugopala et al. ...... H04L 41/142
2020/0092175 A1* 3/2020 Huberman ............ H04L 41/147

* cited by examiner

*Primary Examiner* — Adnan M Mirza
(74) *Attorney, Agent, or Firm* — Pillsbury Winthrop Shaw Pittman, LLP (57) ABSTRACT

Methods and systems for predicting successful data transmission during mass communications across computer networks featuring disparate entities and imbalanced data sets using machine learning models. For example, the methods and systems provide a prediction as to whether or not a communication will be successful prior to the transmission being sent. Moreover, in some embodiments, the methods and systems described herein provide probability of a successful transmission as a function of time. For example, the methods and system provide a probability of how likely a communication will succeed (or fail) if it is sent at various times. Additionally, in some embodiments, the methods and systems may alert a sender prior to the transmission of a communication that the transmission is likely to succeed or fail.

20 Claims, 7 Drawing Sheets

METHODS AND SYSTEMS FOR PREDICTING SUCCESSFUL DATA TRANSMISSION DURING MASS COMMUNICATIONS ACROSS COMPUTER NETWORKS FEATURING DISPARATE ENTITIES AND IMBALANCED DATA SETS USING MACHINE LEARNING MODELS

FIELD OF THE INVENTION

The invention relates to predicting successful data transmission during mass communications across computer networks featuring disparate entities and imbalanced data sets using machine learning models.

BACKGROUND

In recent years, the volume and uses of data has increased exponentially. Along with this increased use, the complexity of transmitting data has also increased. For example, direct, wired connections have given way to diverse multi-platform networks, each with varying and alternative connection points, and each managed by different entities. Due to the complex web of these networks, and the fact that network management is based on exponentially large sets of variables, it is a virtual certainty that different sets of data transmitted across a network will never take the same network pathway.

SUMMARY

The aforementioned nature of network communications results in an environment in which the route that a communication will take is often difficult to determine. Due to this opaqueness, it is likewise difficult to determine whether or not a communication has been completed (e.g., whether or not a communication has successful been received at its destination). Conventional techniques for determining whether or not a communication has successfully reached its destination rely on reactive systems. For example, to identify packet loss, a system may use status information from network equipment to log detected errors in data transmission. Alternatively, the communication itself may include instructions to send a return message verifying safe delivery (e.g., a read receipt). In both cases, however, a sender does not know whether or not a communication will be successful prior to transmission. This issue is only compounded as the number of communications increases.

Accordingly, in contrast to the reactive systems discussed above, the methods and systems described herein provide a prediction as to whether or not a communication will be successful prior to the transmission being sent. Moreover, in some embodiments, the methods and systems described herein provide probability of a successful transmission as a function of time. For example, the methods and system provide a probability of how likely a communication will succeed (or fail) if it is sent at various times. Additionally, in some embodiments, the methods and systems may alert a sender prior to the transmission of a communication that the transmission is likely to succeed or fail.

Notably, conventional systems have no mechanism to provide this functionality when transmitting data during mass communications across computer networks because (i) the network pathway that any one communication may take is different from another, (ii) the operational issues (e.g., network congestion, network errors, etc.) differ depending on which pathway is taken, and (iii) the operational issues are constantly changing. The methods and systems described herein overcome these issues through the use of machine learning models that analyze and predict network conditions in order to predict whether or not a communication with be successful.

However, the application of machine learning models to this technical problem introduces numerous additional problems. First, in mass communications the entities that may be sending data are constantly changing, and the type and amount of data in the communications is constantly changing as well. This leads to an issue of imbalanced data sets. To overcome this first hurdle, the methods and systems described herein use data sets with a specific data structure. This data structure includes specific features (e.g., categories of data) that identify the communication, describe the communication, identify the recipient, and describe the network conditions. Furthermore, each of these data structures is time dependent, and is tagged with a time component.

Second, in order to ensure proper data collection, collected data, and feature inputs based on that data, must be qualitatively stable (e.g. no changes in fields, no differences in collection, etc.), because any changes in generation, type, and/or quality of data used to create feature input for a machine learning model will impact model execution and performance. This is particularly problematic because if, or when, entities and recipient are made aware of the existence of a communication failure prediction model, their behavior may change and adversely impact model performance. To overcome this second issue, the methods and system described use specifically engineered feature inputs that minimizes disruptions in the stability of data while adjusting for dynamic changes in network and entity performance. For example, feature inputs may be engineered to use classes of information that dynamically adjust based on both entity and network conditions (e.g., in order to predict changes in behavior), as well as dynamically trimmed based feature importance (e.g., in order to maintain data stability).

Third, even after accounting for imbalanced data sets and data stability, as described above, predicting successful data transmission during mass communications across computer networks featuring disparate entities using machine learning models results in another hurdle, namely that all variables where constantly changing. For example, computer networks are constantly increasing in complexity, communications, entities, and recipient are constantly increasing in number, and the types and sizes of communications are constantly increasing. Due to this dynamic global variable creep, the methods and systems described herein train the machine learning models in a specific way. For example, as opposed to using conventional cross-fold validation techniques, training for the machine learning models described herein was performed using data from an earlier time than the testing set. That is, the testing set is drawn chronologically later than the training set. Moreover, the validation set is unseen data from still later in time than the test set. For example, data from January to April may be used to train a model, which is then tested using data from May to July. The model is then validated using data from August. The machine learning model is then ready to predict communication success rate for a time period after August.

In one aspect, methods and systems are described for predicting successful data transmission during mass communications across computer networks featuring disparate entities using machine learning models. For example, the system may receive a first feature input and first times for prediction, wherein the first feature input is based on a record for a first pending communication, wherein the record indicates a communication characteristic, a recipient identifier, and a communication identifier for the first pending communication. The system may then input the first feature input into a machine learning model, wherein the machine learning model is trained to classify a first subset of feature inputs as corresponding to one of a plurality of predicted communication success rates at given times, wherein each of the first subset of feature inputs corresponds to a respective, previously transmitted communication, wherein each feature input of the first subset of feature inputs is based on a respective record of a plurality of records and a historical network metric that corresponds to a transmission time of the respective record. The system may then receive an output from the machine learning model. The system may then generate for display, on a user interface, a predicted communication success rate for the first pending communication at each of the first times based on the output.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
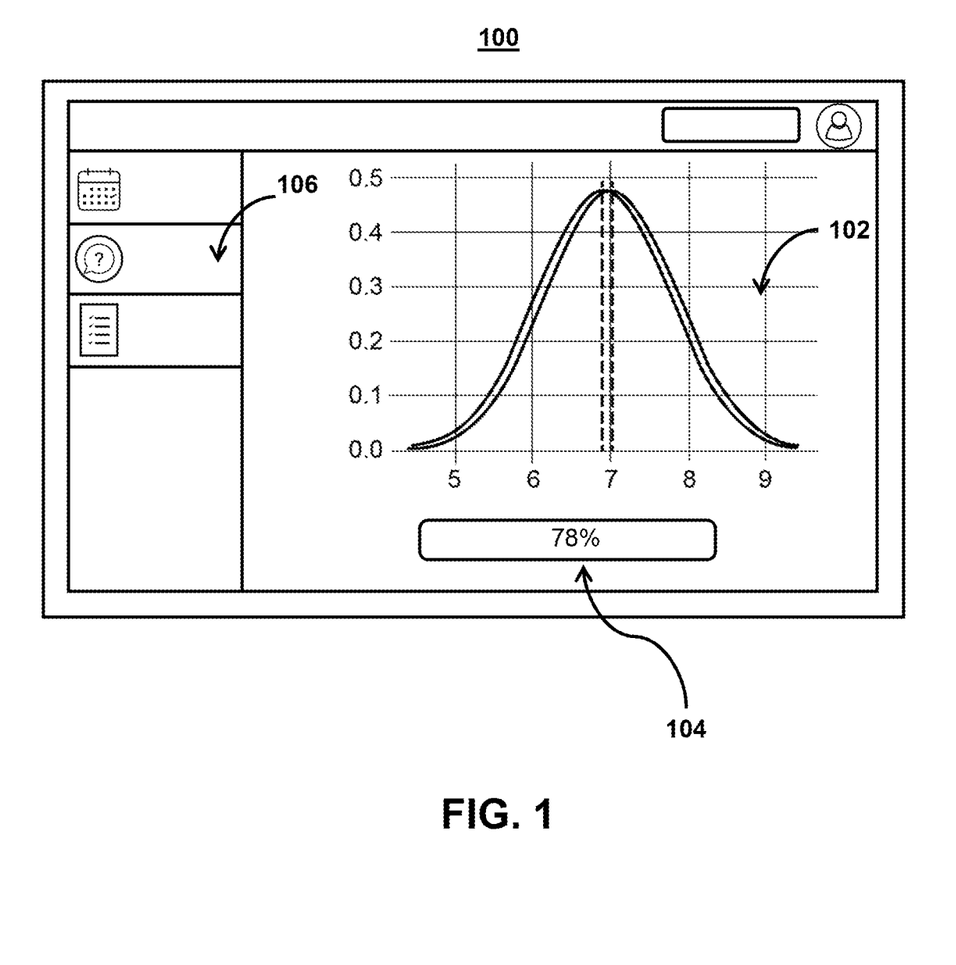
FIG. 1 shows an illustrative user interface for receiving predictions of successful data transmission during mass communications across computer networks featuring disparate entities and imbalanced data sets using machine learning models, in accordance with one or more embodiments.

FIG. 1 shows an illustrative user interface for receiving predictions on successful data transmission during mass communications across computer networks featuring disparate entities and imbalanced data sets using machine learning models, in accordance with one or more embodiments. For example, FIG. 1 shows user interface 100 (FIG. 1). User interface 100 may represent a user interface through which a user may request predictions of whether or not a communication will be successfully completed.

For example, user interface 100 may provide a quantitative or qualitative description as to whether or not a given communication or group of communications will likely be completed and/or fail. User interface 100 may express this as a graphical representation (e.g., representation 102) or a textual description (e.g., description 104). Furthermore, user interface 100 may receive, e.g. via inputs through icons 106, one or more options for selecting communications for the purpose of modifying prediction criteria and/or how a prediction is displayed.

For example, a user interface may display the likelihood that a communication (or group of communications (e.g., communications sent by the same entity and/or for the same purpose) may be completed and/or may fail. The system may generate a recommendation and/or visual display of this prediction. In some embodiments, the prediction may be expressed in terms of a probability. Furthermore, the prediction may be expressed as a probability of time. For example, user interface 100 may indicate the likelihood that a given communication will be completed (or fail) at a given time. For example, user interface 100 may include representation 102, which indicates the likelihood of completion over a four hour period. User interface 100 may also provide recommendations for the best time (e.g., a time with the highest determined probability of success) for sending a communication. User interface 100 may also receive user input to request alerts if a likelihood of completion falls below a given threshold.

In some embodiments, a request for a prediction may be structured as an API request that includes a URL, body, and method. The API request may correspond to one half of the API request-response cycle between one or more devices and/or applications to complete the request. For example, the system (e.g., user device 202 (FIG. 2) may communicate in HTTP (Hyper Text Transfer Protocol) through a request-response cycle. To make a valid request, the requester may include a URL (Uniform Resource Locator), method, list of headers, and/or body. The URL may indicate to the verification service what resources to use (e.g., "Communication-PredictionRequest"). The body may contain headers and data. The headers may provide metadata about the request (e.g., the name of the requester, the user account for which access is needed, etc.) and the body may indicate a communication for which to provide a prediction.

User interface 100 may provide predictions for communications of various types. For example, the systems may determine whether or not a set of communications (e.g., representing processing requests in a computer environment) will be completed. For example, while a set of cloud-engines may be available to process client requests, the system may predict which of the expected client requests may fail (e.g., based on available capacity), which minimizes the cost of creating additional engines and failed client requests.

In another example, the system may predict communication failures, in which each communication corresponds to a transaction in a securities marketplace (e.g., treasury securities). For example, at a pre-selected timepoint (e.g. noon, 1 pm or 2 pm) before market close (3 pm), the system may ingest a feature input based on transaction data, securities data, and counterparty information. The system may additionally or alternatively compute engineered features based on the transaction data, securities data, and counterparty information. The system may then assign each transaction pending a failure probability score. These probability scores (e.g., predictions of a success rate of the communication) may be used by the system to alert a user of transactions with high failure probability. In such cases, the system may allow users to alert counterparties and potentially provide them alternative avenues for transaction completion before a market close; thus, saving involved parties fees resulting from failed transactions.

For example, the system may predict a material percentage of settlement failures starting at 1 PM daily, approximately 2.5 hours before the market close. Accordingly, users will be able to view a communication (e.g., transaction delivery) failure probability score for each communication (e.g., settlement transaction from 1 PM onwards). Depending on the materiality of the communication (e.g., value of the transaction) and the associated prediction, the system may choose to mitigate the impact via multiple actions, some of which include, but are not limited to, liaising with (downstream) receivers of those securities to caution them of an impending failure and recommending them to source those securities alternately, liaising with (upstream) deliverers of the said securities, owing to there being a daisy chain in the transactional flow, and confirming with them about their ability to deliver, so as to manage their positions more efficiently, or sourcing these securities from alternate avenues.

In another example, systems may be used in order to fulfill orders in a supply chain. For example, communications may represent products for filling orders. The system may predict whether a given product will be available in a warehouse for delivery. Alternatively or additionally, the system may predict whether a client order will fail to be processed due to lack of available product in the warehouse. For example, a client order may need to be processed by a certain time in order to make it to the truck for delivery, which requires that the product be delivered to the warehouse ahead of its expected use. The system may predict whether or not this communication of the product is likely to fail.

Figure 2:
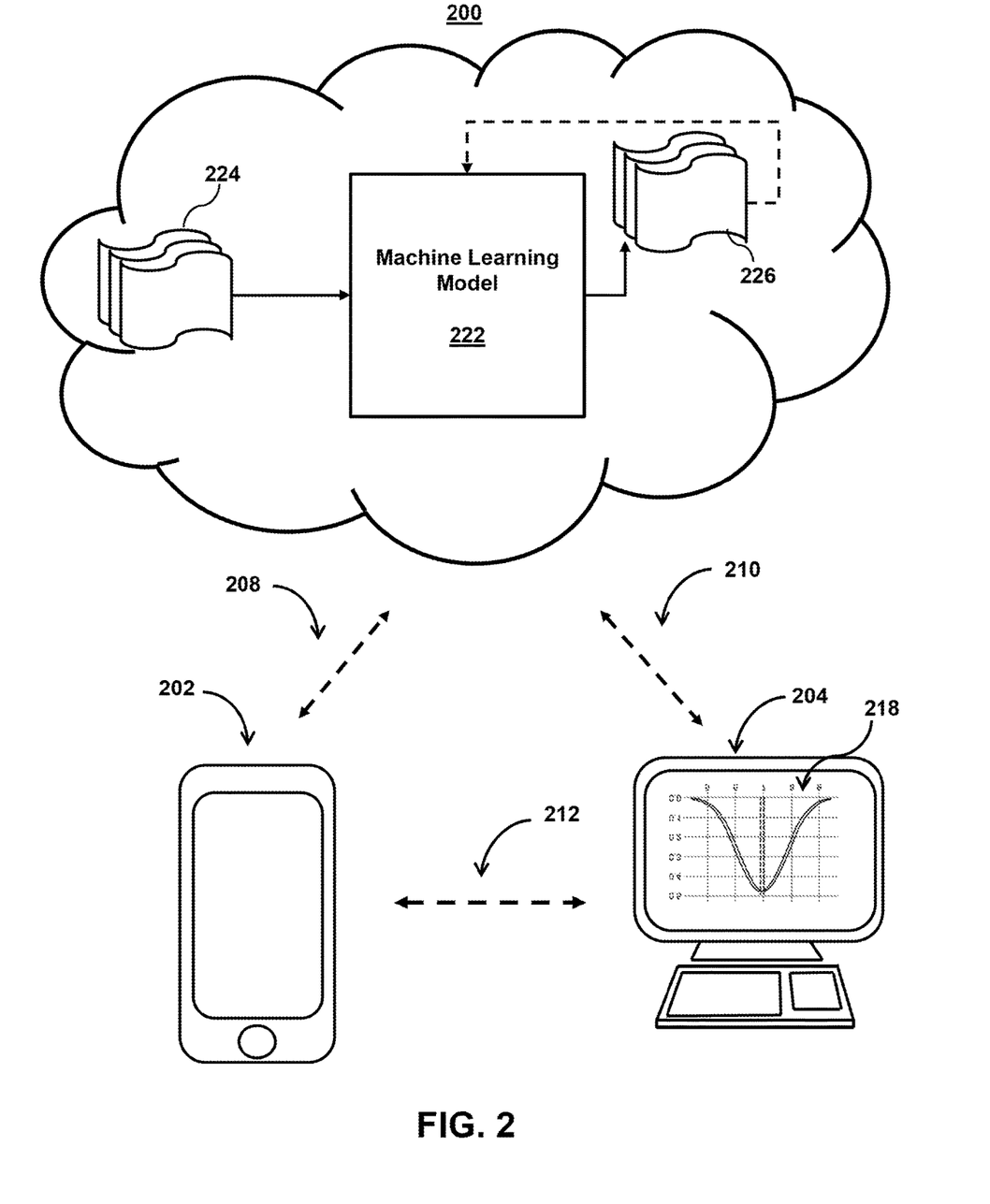
FIG. 2 shows an illustrative system for predicting successful data transmission during mass communications across computer networks featuring disparate entities and imbalanced data sets using machine learning models, in accordance with one or more embodiments.

FIG. 2 shows an illustrative system for predicting successful data transmission during mass communications across computer networks featuring disparate entities and imbalanced data sets using machine learning models, in accordance with one or more embodiments. As shown in FIG. 2, system 200 may include client device 202, client device 204, or other components. Each of client devices 202 and 204 may include any type of mobile terminal, fixed terminal, or other device. Each of these devices may receive content and data via input/output (hereinafter "I/O") paths, and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 202 and 204 may include a desktop computer, a server, or other client device. Users may, for instance, utilize one or more client devices 202 and 204 to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of client device 202, those operations may, in some embodiments, be performed by components of client device 204. It should be noted that, although some embodiments are described herein with respect to machine learning models, other prediction models (e.g., statistical models or other analytics models) may be used in lieu of, or in addition to machine learning models in other embodiments (e.g., a statistical model replacing a machine learning model, and a non-statistical model replacing a non-machine-learning model in one or more embodiments).

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

FIG. 2 also includes communication paths 208, 210, and 212. Communication paths 208, 210, and 212 may include the Internet, a mobile phone network, a mobile voice or data network (e.g., a 4G or LTE network), a cable network, a public switched telephone network, other types of communications network, or combinations of communications networks. Communication paths 208, 210, and 212 may separately or together include one or more communications paths, such as a satellite path, a fiber-optic path, a cable path, a path that supports Internet communications (e.g., IPTV), free-space connections (e.g., for broadcast or other wireless signals), any other suitable wired or wireless communications path, or combination of such paths. The computing devices may include additional communication paths linking a plurality of hardware, software, and/or firmware components operating together. For example, the computing devices may be implemented by a cloud of computing platforms operating together as the computing devices.

In some embodiments, system 200 may use one or more prediction models to generate recommendations related to predicted communication success rates for pending communications. For example, as shown in FIG. 2, system 200 may receive a user request via a user interface (e.g., user interface 100 (FIG. 1)) using machine learning model 222. The system may output a recommendation of a predicted success rate of a pending communication as shown as output 218 on client device 204. The system may include one or more neural networks (e.g., as discussed in relation to FIG. 3) or other machine learning models. The recommendation may be displayed as output 218 on client device 204.

In some embodiments, machine learning model 222 may be a LightGBM gradient-boosted classifier with up to 47 engineered features (and up to a total of 51 features) and an optimized parameter set. For example, the use of the aforementioned classifier provided the best compromise in terms of results (precision/recall), training speed, and potential future model interpretability. It was favored over neural networks, other gradient-boosted tree algorithms (like XGBoost), and Random Forest classifiers because histogram-based algorithms, compared to conventional pre-sort-based algorithms, increase speed and reduces memory usage.

Additionally, the aforementioned classifier has leaf-wise tree growth, compared to conventional level-wise tree growth, which achieves lower loss. This classifier also provides an optimal solution for categorical variable splitting and optimizes network communication to increase speed, and also provides feature and data parallel learning.

As an example, with respect to FIG. 2, machine learning model 222 may take inputs 224 and provide outputs 226. The inputs may include multiple data sets, such as a training data set and a test data set. In some embodiments, the system may query raw data in storage (e.g., data structure 400 (FIG. 4)) and extract/manipulate it to produce a table with engineered features (e.g., as described in relation to FIG. 4). The system may then run a selected machine learning algorithm (e.g., as described in relation to FIG. 2) with given parameters (as described in relation to FIG. 2) on the engineered table and save the resultant model. The system may then take test data from the datastore and engineer features. Alternatively, the system may split the table into train/test tables. However, instead of a random/cross-validated split, the system may ensure that training data precedes test data in time to mimic real-world operating conditions so that there is no data leakage in features that exploit future, unknown information. The system may then run the machine learning model on test data and record performance.

In some embodiments, parameter selection may be conducted while balancing results (e.g., based on Precision/Recall), execution time, and while ensuring training data is not overfit. In some embodiments, the main parameters of interest were: learning rate (0.01-0.5), with the final value of 0.08 being selected as a good compromise between speed and results as lowering further nearly doubled training time; maximum tree depth (10, 50, 100), which in some embodiments may potentially be lowered to prevent overfitting in response to training data size increases; number of estimators (100, 300); number of leaves (300, 600, 900, 1200); and number of iterations (100, 500, 1000, 1200). Additionally, raising values for the above three parameters to a maximum in the range improved results without significantly impacting execution time or overfitting. Parameter adjustments may occur during a test phase on a data set pulled from a time period after a training phase.

In one use case, outputs 226 may be fed back to machine learning model 222 as input to train machine learning model 222 (e.g., alone or in conjunction with user indications of the accuracy of outputs 226, labels associated with the inputs, or with other reference feedback information). In another use case, machine learning model 222 may update its configurations (e.g., weights, biases, or other parameters) based on its assessment of its prediction (e.g., outputs 226) and reference feedback information (e.g., user indication of accuracy, reference labels, or other information). In another use case, where machine learning model 222 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 222 may be trained to generate better predictions. For example, machine learning model 222 may be trained to detect a known classification (e.g., a predicted communication success rate and/or a probability of a predicted communication success rate) based on a set of training data comprising labeled feature vectors corresponding to the known classifications.

Figure 3:
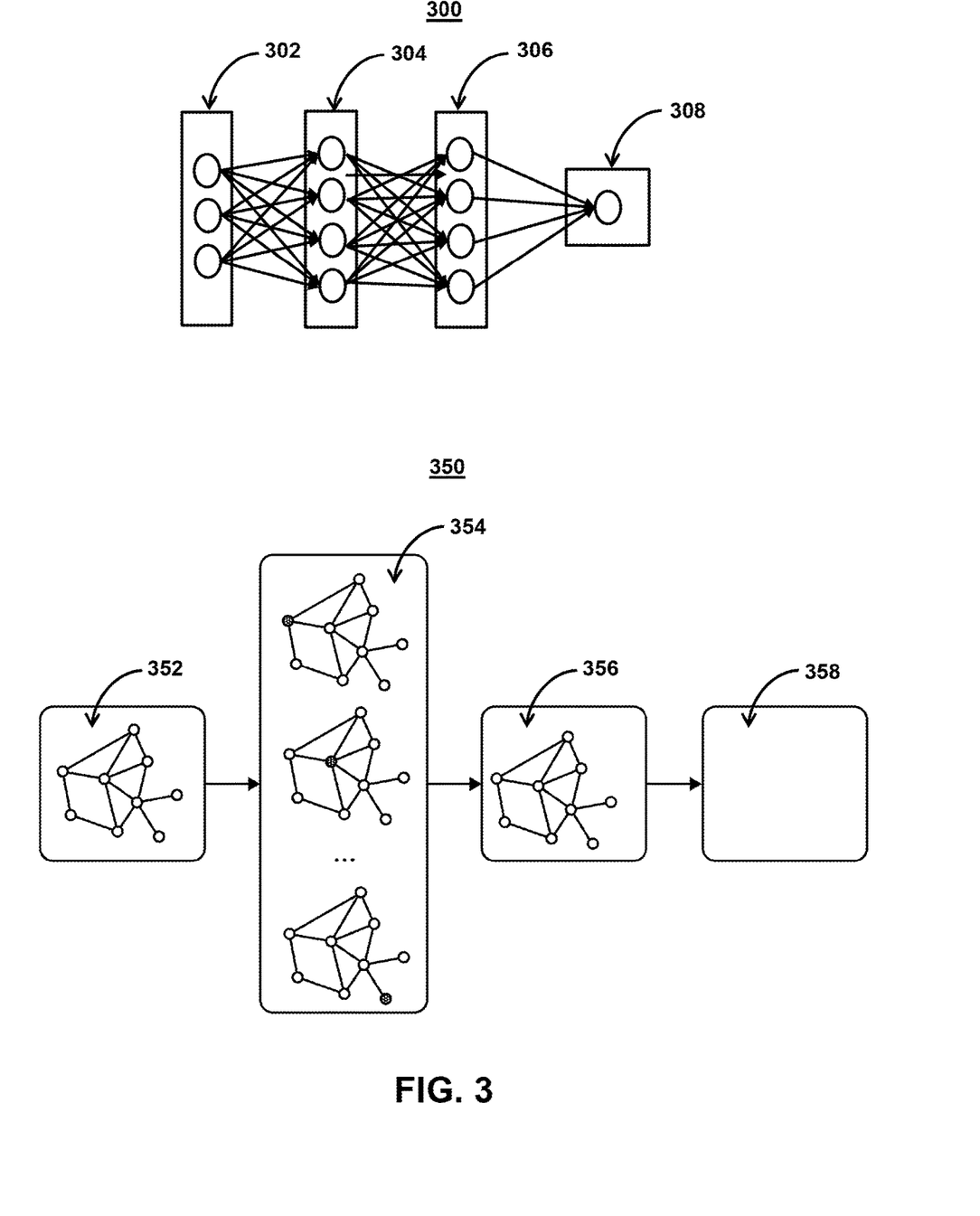
FIG. 3 shows an illustrative diagram for predicting successful data transmission during mass communications across computer networks featuring disparate entities and imbalanced data sets using machine learning models, in accordance with one or more embodiments.

FIG. 3 shows an illustrative diagram for predicting successful data transmission during mass communications across computer networks featuring disparate entities and imbalanced data sets using machine learning models, in accordance with one or more embodiments. Model 300 illustrates an artificial neural network. Model 300 includes input layer 302. Model 300 also includes one or more hidden layers (e.g., hidden layer 304 and hidden layer 306). Model 300 may be based on a large collection of neural units (or artificial neurons). Model 300 loosely mimics the manner in which a biological brain works (e.g., via large clusters of biological neurons connected by axons). Each neural unit of model 300 may be connected with many other neural units of model 300. Such connections can be enforcing or inhibitory in their effect on the activation state of connected neural units. In some embodiments, each individual neural unit may have a summation function, which combines the values of all of its inputs together. In some embodiments, each connection (or the neural unit itself) may have a threshold function such that the signal must surpass before it propagates to other neural units. Model 300 may be self-learning and trained, rather than explicitly programmed, and can perform significantly better in certain areas of problem solving, as compared to traditional computer programs. During training, output layer 308 may corresponds to a classification of model 300 (e.g., whether or not an alert status corresponds to a given value corresponding to the plurality of computer states), and an input known to correspond to that classification may be input into input layer 302. In some embodiments, model 300 may include multiple layers (e.g., where a signal path traverses from front layers to back layers). In some embodiments, back propagation techniques may be utilized by model 300 where forward stimulation is used to reset weights on the "front" neural units. In some embodiments, stimulation and inhibition of model 300 may be more free-flowing, with connections interacting in a more chaotic and complex fashion. Model 300 also includes output layer 308. During testing, output layer 308 may indicate whether or not a given input corresponds to a classification of model 300 (e.g., whether or not an alert status corresponds to a given value corresponding to the plurality of computer states).

FIG. 3 also includes model 350, which is a graphical neural network (e.g., as described in relation to FIG. 7 below). The graphical neural network may be an artificial neural network that features one or more hidden layers. As shown in model 350, input layer 352 may proceed to hidden layer 354 (which has been shown as a single layer for simplicity) before proceeding to output layer 356 and generating an output. This output may then be inputted into layer 358. Layer 358 may include a gradient boosting model. For example, the graph neural network may be trained using historical directed graphs of the communications, and the derived graph dimensions for multiple time-periods. The directed graph may represent the various features (e.g., of a feature input) of a communication as further described below in relation to FIG. 4.

The gradient boosting model may be trained using the inputs from the graph neural network. The gradient boosting model may then be used to derive a failure prediction for every pending task queued up for allocation. In some embodiments, this prediction may be predicted at a current time, or irrespective of a time.

For example, as described herein, the system may predict a communication level event, which may be influenced by the delivery party and receiving party of the communication, as well as the network upon which the communication is sent, and characteristics of the communication itself. To do so, the system may create feature inputs that include features based on: a calculation of a fail ratio (fail count/total communication count) at each delivery party and at communication entity level at the prediction point periodically, which can be daily, weekly, or monthly; a calculation of the fail ratio (fail count/total communication count) at each delivery party at the prediction point periodically, which can be daily, weekly, or monthly; and/or a calculation of the fail ratio (fail count/total communication count) at communication entity level at the prediction point periodically, which can be daily, weekly, or monthly.

The system also includes engineered features (e.g., as further described in relation to FIG. 4 below) such as feature classes based on the velocity of a communication, which describe how fast a communication happens. For example, these features fall within each prediction period and within a certain amount of time, which may be at an interval of minute, hour, day, week etc., the average successful communication, and/or the total failed communications. These may also include features that relate to each prediction period and within specific time periods, which may be at an interval of minute, hour, day, week etc., the total successful communications, the total failed communications, as well as a time period/total time duration of that specific time period, wherein the specific time period may be hourly (e.g., from 10am-11 am, from 11 am to 12 noon). Features may also relate to taking a maximum, minimum, and/or average of the above features over multiple prediction periods, which may be, e.g., 1, 3, 5, 15, 30, 100, etc., wherein each prediction period can be a minute, an hour, a day, a week.)

Figure 4:
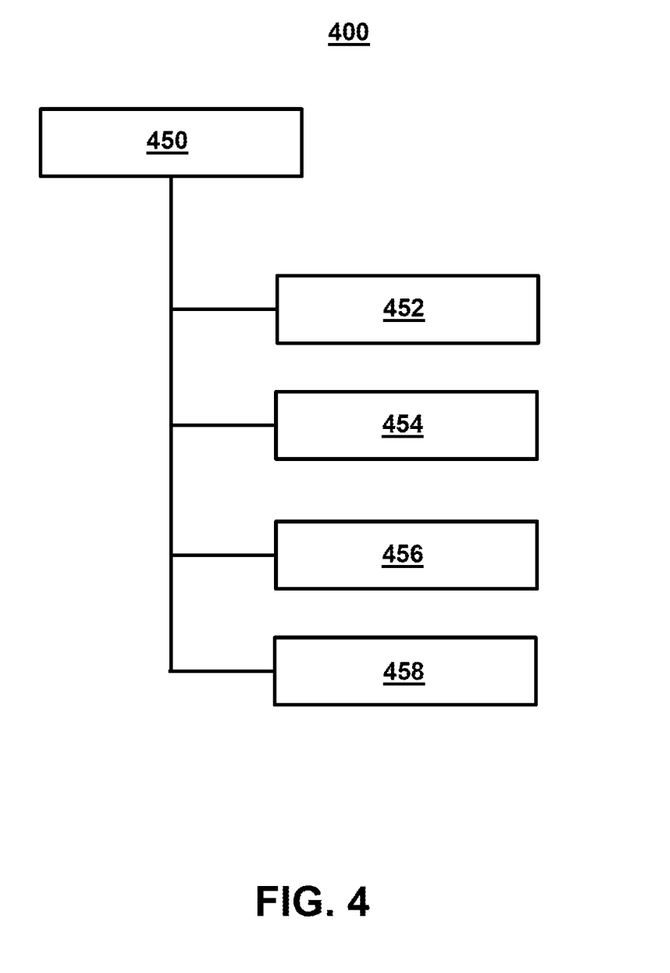
FIG. 4 shows an illustrative data structure for use in predicting successful data transmission during mass communications across computer networks featuring disparate entities and imbalanced data sets using machine learning models, in accordance with one or more embodiments.

Additionally or alternatively, the system may include features based on scarcity (e.g., a metric capturing which communications are becoming scarcer—such as which types of communications (e.g., transactions) are receiving more or fewer task requests in given time periods compared to other time periods. This feature may also introduce a Pareto Distribution—as scarcity follows a pareto curve—where a few of the entities that are sending communications may have an outsized impact on an outcome—versus a normal bell curve distribution. In some embodiments, the scarcity metric may be defined as (supply+holding)/demand). In some embodiments, the scarcity metric may also be defined as ($\alpha$*supply+holding)/demand) where $\alpha$ is a factor that represents a ratio between the successfully allocated task (e.g., a completed communication), and total allocated tasks (e.g., communications) of that type. Additionally or alternatively, the system may include features based on the number of communications that were manually cancelled. Additionally or alternatively, the system may include features based on probabilistic estimations of available capacity. Existing available capacity, expected communications given historical use, and expected additional communications of a given communication type will be generated. Additionally or alternatively, the system may include features based on one or more aggregated metrics. For example, the features may be based on counts of communications, counts of requested features, averages of completed communications, canceled communications, pending communications, available capacity, moving average features that calculate average values of other features over the course of several periods (e.g., 1, 3, 5-day averages), as well as fail ratios for each communication type (e.g., determined based on the fail count/total communication count).

Additionally or alternatively, the system may include features based on centrality. Centrality features include data related to the complexity of a graph. For example, centrality features may include a number of communications during a period. Centrality features may also include harmonic centrality variables for a network in a graph. These features may measure an average length of the shortest path between the node and all other nodes in the graph, defined as $(x)=\Sigma 1d(y,x) y \neq x$, where $1/d(y,x)=0$ if there is no path between two nodes. Centrality features may also include a degree of centrality associated with a node in the graph, and a calculation of the number of edges that connect to a node in the graph. Centrality features may also include closeness $g(v)$, which is a measure of the number of shortest paths passing through two nodes s and t of the graph as defined as $g(v)=\Sigma \sigma st(v) \sigma sts \neq v \neq t$, where $\sigma st$ is the total number of shortest paths from node s to node t, and $\sigma st(v)$ is the number of those paths that pass through a node v.

FIG. 4 shows an illustrative data structure for use in predicting successful data transmission during mass communications across computer networks featuring disparate entities and imbalanced data sets using machine learning models, in accordance with one or more embodiments. For example, FIG. 4 shows data structure 400. For example, data structure 400 may comprise a representation of a portion of a tabular database that contains information on a plurality of communications. For example, the tabular database may be a database comprising a plurality of records, wherein each record of the plurality of records corresponds to a respective, previously transmitted, pending, queued, or potential communication, wherein each record is organized according to a respective transmission time of a plurality of transmission times, and wherein each of the plurality of records indicates a communication characteristic, a recipient identifier, and a communication identifier.

Additionally or alternatively, data structure 400, or another data structure or database, may comprise a database of historical network metrics for each of the plurality of transmission times. For example, the database of historical network metrics for each of the plurality of transmission times may include information about characteristics of all communications (or a subset of communications), which may be from one or more parties, received by one or more recipients, and transmitted along one or more routes of a network.

Data structure 400 may comprise a snapshot in time of information about a communication. For example, data structure 400 may comprise a portion of a database that includes numerous snapshots of different communications at different times. For example, data structure 400 may include snapshots of tables in a CSV format for 12 PM, 1 PM, 2 PM in the January to July timeframe. Data structure 400 may include numerous types of data, and may include log tables with one or more types of data (e.g., as described in field 452, 454, 456, and/or 458.

For example, data structure 400 shows record 450. Record 450 may correspond to a communication. Record 450 may be organized to include information about the respective communication. For example, record 450 may include a series of fields, in which each field may comprise information about the respective communication, and/or characteristics of a network during a communication.

For example, record 450 may include field 452, field 454, field 456, and field 458. Field 452 may include a time corresponding to a transmission. For example, this time may correspond to a time of communication, a time of delivery, a time of receipt, and/or another time associated with the communication. For example, the system may use the time found in field 452 to determine a network metric corresponding to the transmission time of a communication.

Field 454 may include a communication characteristic. For example, the field 454 may include any information that describes the contents, size, quality, type, or other information used to distinguish one communication from another. For example, field 454 may be a qualitative or quantitative description of the communication. In some embodiments, field 454 may comprise transaction information, such as an amount (e.g., a monetary amount or a data amount), a size (e.g., file size, monetary amount, etc.), quantity (e.g., a quantity of similar communications and/or communications with similar attributes), and/or status (e.g., failed, completed, pending, queued, etc.).

Field 456 may include a recipient identifier. For example, the field 456 may include any information that describes the recipient, including type of recipient, quality of the recipient, or other information used to distinguish one recipient from another. For example, field 456 may be a qualitative (e.g., include a serial number) or quantitative description (e.g., a name, label, etc.) of the recipient. In some embodiments, field 456 may comprise counterparty information (e.g., a blinded identity, balances from a part position table, etc.) about a counterparty (e.g., whether a counterparty is a legal entity, unincorporated entity, or collection of entities to which an exposure to financial risk might exist.).

Field 458 may include a communication identifier. For example, the field 458 may include any information that identifies the communication or otherwise distinguishes one communication from another through a qualitative or quantitative means. For example, field 458 may include an issue data, coupon rate, and/or other information about a Committee on Uniform Securities Identification Procedures ("CUSIP"), including the CUSIP itself. A CUSIP number identifies most financial instruments, including stocks of all registered U.S. and Canadian companies, commercial paper, and U.S. government and municipal bonds. It should be noted that in some embodiments, field 458 may include other serial numbers and/or product identifications (e.g., SKU numbers, etc.).

For example, in some embodiments, a rate of successful communications and/or a number of communications corresponding to the communication identifier may correspond to the velocity of a communication. For example, features in this class may capture a rate (number or quantity of communications per hour) at which communications are completed (or not) at an account (e.g., for a sending or receiving entity) and/or CUSIP level.

For example, in some embodiments a current operational issue related to the recipient identifier may correspond to a scarcity of a communication. For example, features in this class may indicated whether a CUSIP was becoming scarcer in the marketplace such as oversubscription measures (e.g. pending transactions that day over a moving average of pending transactions as the baseline).

For example, a number of entities with pending communications may correspond to the network complexity of a communication. For example, features in this class may describe the number of parties participating in communications of a given CUSIP and their dependencies/connectedness For example, probabilistic estimations of successful communications related to the recipient identifier. For example, features in this class may describe probabilistic estimations of counterparty balances based on existing balance, incoming and outgoing transactions, etc.

In some embodiments, data structure 400 may also include one or more fields that relate to engineered features and/or engineered data (e.g., as also described above in relation to FIG. 3). For example, the system may use feature inputs that include engineered (i.e., non-native data, or data that has been processed and/or modified from its original form when received from a source). In some embodiments, engineered data may be proprietary. For example, classes of this engineered data may include classes of features based on a rate of successful communications, a number of communications corresponding to the communication identifier, communication characteristic, current operational issues related to the recipient identifier, a number of entities with pending communications, and probabilistic estimations of successful communications related to the recipient identifier.

For example, engineered features may be derived from the database table described above. Engineered features may comprise numerical, continuous features (i.e. no categorical features such as delivering party ID). Engineered features may be categorized into numerous classes such as CUSIP level ('cusip_*'): These are largely aggregates (counts or sums) of transactions, transactions quantities, and normalized totals (all '_rate' features i.e. divided by totals) to capture intra-day, baseline and moving average CUSIP velocity. Velocity may refer to the speed at which transactions are completed. The system may also track communications completed, canceled, and/or pending.

Another example of an engineered feature class is delivering party outgoing transactions ('dlvr_*'). Similar to CUSIP-level behavior, these features capture intra-day, baseline, and moving average delivering party delivery for completed, cancelled, and/or pending transactions. Another example of an engineered feature class is delivering party incoming transactions ('dlvr_rcv_*'). These features track incoming transactions for each delivering party. Another example of an engineered feature class is moving average features ('[time]_mav_*'). These features may calculate 1-, 3-, 5-day etc. averages for delivery party and CUSIP market behavior, such as completion rates and pending rates. Another example of an engineered feature class is broad market-based or transaction-level features that do not fit into other the categories. For example, the combination of 'running_sum' and 'prob_*' features are used to predict the probability of a delivering party having sufficient balance (existing BDS and RPO balance+sum of incoming transactions weighted by priority) to fulfill delivery obligations by the end of a day. The 'running_sum' feature tallies the dollar amount of all deliveries by a given delivering party for a particular CUSIP on the business day, and orders them by priority from high to low (because higher priority transactions are more likely to complete), transaction quantity from large to small, transaction amount from large to small (again, larger transaction amounts fail less) and hour of creation from earlier to later. The likelihood of delivery is then the sum of incoming transactions and existing balance divided by the outgoing deliveries (running sum). If greater than 1, then there is a higher chance the delivering party will have sufficient balance to fulfill outstanding obligations for a given CUSIP between the prediction time point and the end of day. Using this measure, probabilistic estimates of counterparty CUSIP balances at the end of day are calculated and fed to the model. The model can then use this information on a per-transaction basis for measuring failure likelihood.

It should be noted that each feature set (e.g., the feature set used to generate a first feature input) may be trimmed based on feature importance measures and iterative tests with increasing numbers of features of decreasing importance (e.g. the 20 most important features only, the top 30 features only etc.). The system may determine a feature importance for each feature in the first subset of feature inputs when classifying the first subset of feature inputs as corresponding to one of the plurality of predicted communication success rates by determining a SHAP ("Shapley Additive explanation") value for each feature. For example, the system may determine a SHAP order mean for each feature (and/or variable in a feature). The system may then rank each feature by the SHAP order mean. The system may then use a predetermined number of features having a certain rank or higher.

Figure 5:
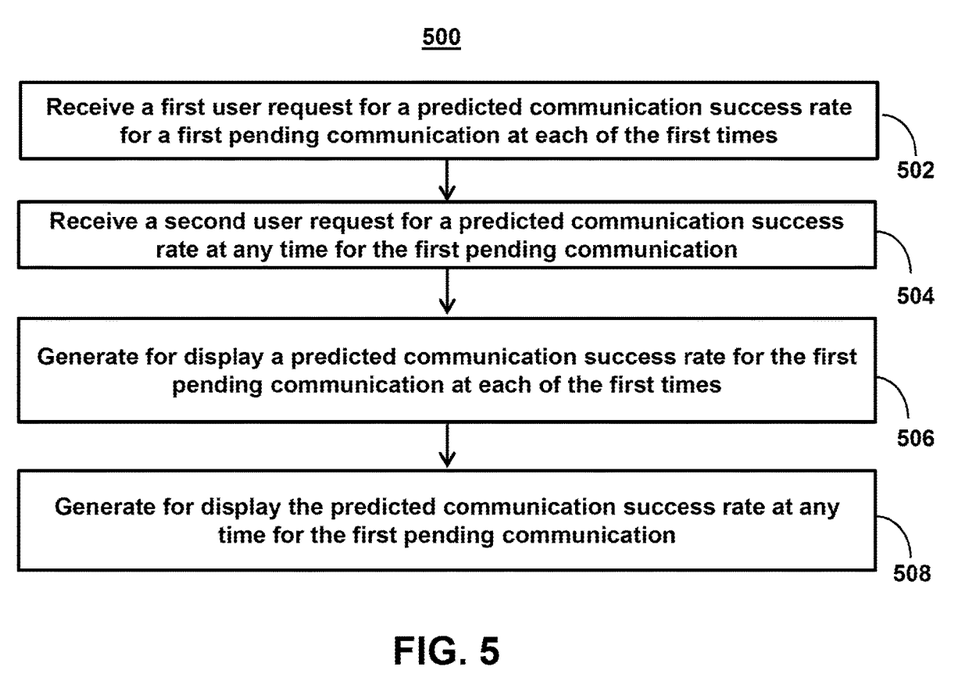
FIG. 5 shows a flowchart of the steps involved in generating predicted communication success rates for pending communications, in accordance with one or more embodiments.

FIG. 5 shows a flowchart of the steps involved in generating predicted communication success rates for pending communications, in accordance with one or more embodiments. For example, process 500 may represent the steps taken by one or more devices as shown in FIG. 2 when generating user interface 100 (FIG. 1).

At step 502, process 500 receives (e.g., by control circuitry of one or more of the devices in FIG. 2) a first user request for a predicted communication success rate for a first pending communication and first times for prediction. For example, a user may wish to see a probability at each of the first times of the likelihood of a successful communication. For example, the system may receive, at a user interface (e.g., user interface 100 (FIG. 1)), a first user request for the predicted communication success rate for a first pending communication at each of the first times. In response to receiving the first user request, the system may generate a first feature input. The first feature input may then be input into a first machine learning model (e.g., as described in FIG. 6).

At step 504, process 500 receives (e.g., by control circuitry of one or more of the devices in FIG. 2) a second user request for a predicted communication success rate at any time for the first pending communication. For example, the system may receive, at the user interface (e.g., user interface 100 (FIG. 1)), a second user request for the predicted communication success rate for the first pending communication at any time. In response to receiving the second user request, the system may generate the second feature input. The second feature input may then be input into a second machine learning model (e.g., as described in FIG. 7).

At step 506, process 500 generates (e.g., by control circuitry of one or more of the devices in FIG. 2) for display a predicted communication success rate for the first pending communication at each of the first times. For example, the system may generate for display, on a user interface (e.g., user interface 100 (FIG. 1)), a predicted communication success rate for the first pending communication at each of the first times based on an output of the first machine learning model (e.g., as described in FIG. 6 below).

At step 508, process 500 generates (e.g., by control circuitry of one or more of the devices in FIG. 2) for display the predicted communication success rate at any time for the first pending communication. For example, the system may generate for display, on the user interface, a predicted communication success rate for the first pending communication at any time based on an output of the second machine learning model (e.g., as described in FIG. 5 below).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-4 could be used to perform one or more of the steps in FIG. 5. Additionally or alternatively, one or more steps of process 500 could be switched with and/or combined with one or more steps in FIGS. 6-7.

Figure 6:
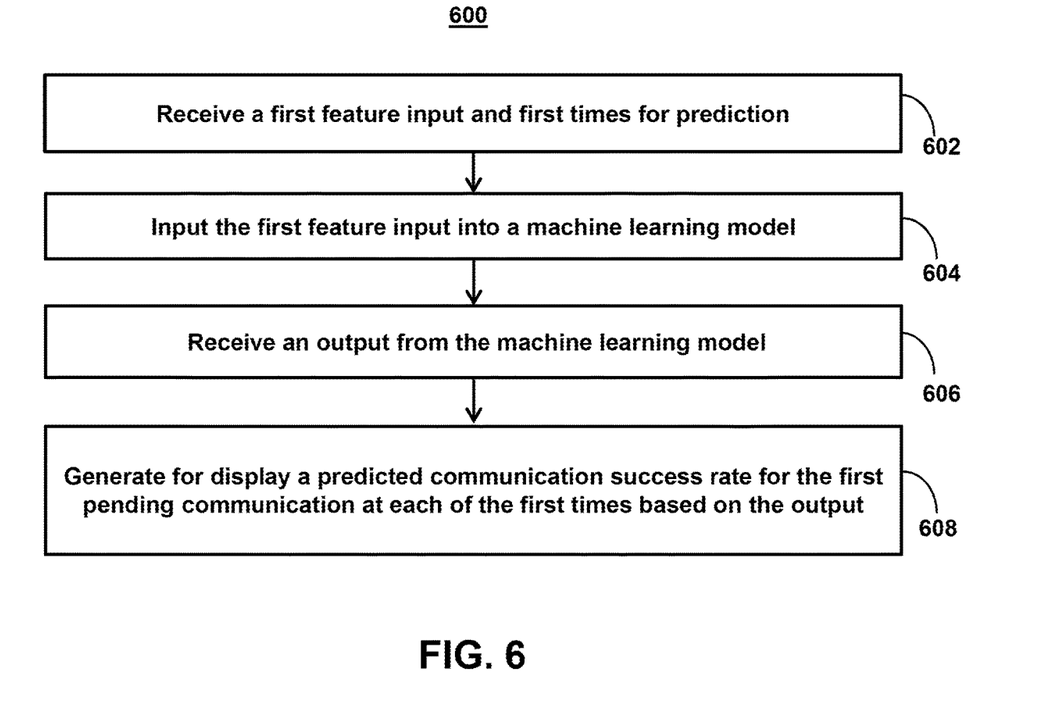
FIG. 6 shows a flowchart of the steps involved in generating a predicted communication success rate for a first pending communication at different times, in accordance with one or more embodiments.

FIG. 6 shows a flowchart of the steps involved in generating predicted communication success rates for pending communications, in accordance with one or more embodiments. For example, process 600 may represent the steps taken by one or more devices, as shown in FIG. 2, when generating user interface 100 (FIG. 1). For example, as opposed to using conventional cross-fold validation techniques, training for the machine learning models described herein was performed using data from an earlier time than the testing set. That is, the testing set is drawn chronologically later than the training set. Moreover, the validation set is unseen data from still later in time than the test set. For example, data from January to April may be used to train a model, which is then tested using data from May to July. The model is then validated using data from August. The machine learning model is then ready to predict communication success rate for a time period after August.

At step 602, process 600 receives (e.g., by control circuitry of one or more of the devices in FIG. 2) a first feature input and first times for prediction. For example, the system may receive a first feature input and first times for prediction, wherein the first feature input is based on a record for a first pending communication, wherein the record indicates a communication characteristic, a recipient identifier, and a communication identifier for the first pending communication.

In some embodiments, each feature may be based on a data structure (e.g., data structure 400 (FIG. 4)). Each feature input of the first subset of feature inputs may be based on a respective record of the plurality of records and a historical network metric that corresponds to a transmission time of each respective record. The transmission time of each respective record of each feature input of the first subset of feature inputs may correspond to a first time period (e.g., a month, a week, and/or other predetermined unit of time).

In some embodiments, the feature input may be specifically configured with specialized classes of data. For example, the first feature input may include classes of features based on a rate of successful communications, a number of communications corresponding to the communication identifier, communication characteristic, current operational issued related to the recipient identifier, a number of entities with pending communications, and/or probabilistic estimations of successful communications related to the recipient identifier. Additionally or alternatively, the first feature input may include an engineered feature class that comprises a baseline and moving average rate of pending communications.

Additionally or alternatively, the system may determine a feature importance of each feature in the first subset of feature inputs when classifying the first subset of feature inputs as corresponding to one of the plurality of predicted communication success rates by determining a SHAP value for each feature. For example, SHAP values are beneficial in determining global interpretability—the collective SHAP values can show how much each predictor contributes, either positively or negatively, to a target variable. SHAP values take a game-theoretic approach to providing predictive model explanations in the form of feature importances. In this setting, the features in a data point are considered "players" in a coalitional game that results in the model's prediction, which is interpreted as the "score" that that particular group of players achieved. Determining how to attribute this score across the various players' contributions would, in the predictive modeling setting, provide an explanation of the model's prediction that determines how each feature contributed to that outcome. With Shapley game theory, this attribution is done by asking how "leaving out" a particular player would change the score that the team achieves; however, most machine learning models fail to produce an output unless all of the features are specified. To avoid this, SHAP defines the result of a model when a subset of features is left out as the conditional expectation of the model's output over the left-out feature values given the fixed values of the left-in feature values.

For example, the system may determine a feature importance of each feature in order to reduce the overall number of features in a feature input. By doing so, the system may limit overall processing time in order to both increase the speed at which user requests (e.g., entered into user interface 100 (FIG. 1)) are responded to as well as limit the amount of resources needed to respond to the request.

In some embodiments, the system may query raw data in storage (e.g., data structure 400 (FIG. 4)) and extract/manipulate it to produce a table with engineered features (e.g., as described in relation to FIG. 4). The system may then run a selected machine learning algorithm (e.g., as described in relation to FIG. 2) with given parameters (as described in relation to FIG. 2) on the engineered table and save the resultant model. The system may then take test data from the datastore and engineered features. Alternatively, the system may split the table into train/test tables. However, instead of a random/cross-validated split, the system may ensure that training data precedes test data in time to mimic real-world operating conditions, and such that there is no data leakage in features that exploit future, unknown information. The system may then run the machine learning model on test data and record performance. It should also be noted that in some embodiments, the system may order datasets such that a first, second, and third data sets (in terms of temporal order) corresponds to training, validating, and testing, respectively.

At step 604, process 600 inputs (e.g., by control circuitry of one or more of the devices in FIG. 2) the first feature input into a machine learning model (e.g., machine learning model utilizing a gradient boosting framework that uses tree based learning algorithms). For example, the system may input the first feature input into a machine learning model, wherein the machine learning model is trained to classify a first subset of feature inputs as corresponding to one of a plurality of predicted communication success rates at given times, wherein each of the first subset of feature inputs corresponds to a respective, previously transmitted communication, wherein each feature input of the first subset of feature inputs is based on a respective record of a plurality of records and a historical network metric that corresponds to a transmission time of the respective record.

Additionally or alternatively, the machine learning model may be validated using a second subset of feature inputs, wherein each feature input of the second subset of feature inputs corresponds to a second time period, and wherein the second time period is after the first time period. For example, the system may rely on data from a time period that is after the time period of the data used to train the machine learning model. Additionally or alternatively, the first feature input may correspond to (and/or the underlying data used to generate the first feature input may correspond to) a third time period. The third time period may be after the second time period. For example, the system may ensure that the machine learning model used to predict communication success rates is trained on data from a previous time period.

For example, as opposed to using conventional cross-fold validation techniques, training for the machine learning models described herein was performed using data from an earlier time (e.g., the first subset of feature inputs) than the testing set (e.g., a subset of feature inputs between from a time period between that of the first subset and the second subset (e.g., a fourth subset of feature inputs)). That is, the testing set (e.g., a fourth subset of feature inputs) is drawn chronologically later than the training set (e.g., the first subset of feature inputs). Moreover, the validation set (e.g., the second subset of feature inputs) is unseen data from still later in time than the test set (e.g., a fourth subset of feature inputs). For example, data from January to April (e.g., a first time period) may be used to train a model, which is then tested using data from May to July (e.g., a fourth time period). The model is then validated using data from August (e.g., a second time period). The machine learning model is then ready to predict communication success rate for a time period after August (e.g., a third time period).

At step 606, process 600 receives (e.g., by control circuitry of one or more of the devices in FIG. 2) an output from the machine learning model. For example, the system may receive an output from the machine learning model. For example, the output may comprise a feature input that is converted by the system into a series of probabilities.

At step 608, process 600 generates (e.g., by control circuitry of one or more of the devices in FIG. 2) for display a predicted communication success rate for the first pending communication at each of the first times (e.g., a success rate if the transmission is sent a 1 pm, 2 pm, 3 pm, respectively) based on the output. For example, the system may generate for display, on a user interface (e.g., user interface 100 (FIG.

1)), a predicted communication success rate for the first pending communication at each of the first times based on the output.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-4 could be used to perform one or more of the steps in FIG. 6. Additionally or alternatively, one or more steps of process 600 could be switched with and/or combined with one or more steps in FIGS. 5 and 7.

Figure 7:
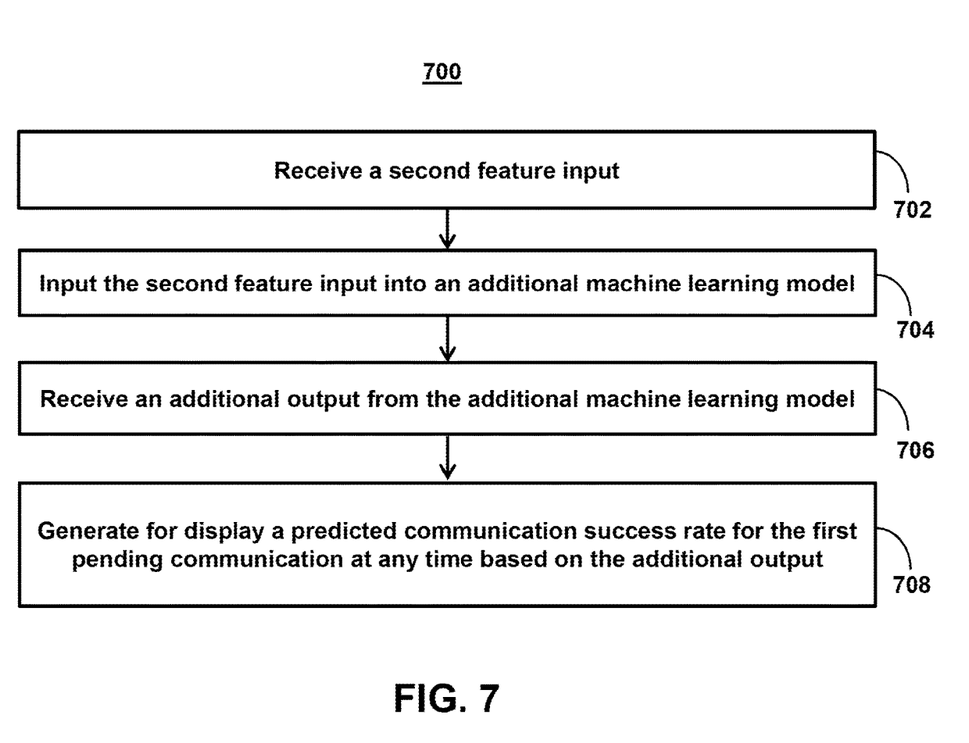
FIG. 7 shows a flowchart of the steps involved in generating a predicted communication success rate for a first pending communication irrespective of a transmission time, in accordance with one or more embodiments.

FIG. 7 shows a flowchart of the steps involved in generating predicted communication success rates for pending communications, in accordance with one or more embodiments. For example, process 700 may represent the steps taken by one or more devices as shown in FIG. 2 when generating user interface 100 (FIG. 1).

At step 702, process 700 receives (e.g., by control circuitry of one or more of the devices in FIG. 2) a second feature input. For example, the system may receive a second feature input (e.g., via user interface 100 (FIG. 1)), wherein the second feature input is based on a record for a first pending communication.

At step 704, process 700 inputs (e.g., by control circuitry of one or more of the devices in FIG. 2) the second feature input into a machine learning model. For example, the system may input the second feature input into the second machine learning model, wherein the second machine learning model is trained to predict a communication success rate at any time. For example, wherein the second machine learning model may comprise a graph neural network, wherein the graph neural network is trained using historical directed graphs corresponding to the first subset of feature inputs, and a second subset of feature inputs, wherein each feature input of the second subset of feature inputs corresponds to a second time period, and wherein the second time period is after the first time period. Additionally or alternatively, the second machine learning model may comprise a gradient boosting model. For example, the gradient boosting model may be trained on outputs of the graph neural network.

At step 706, process 700 receives (e.g., by control circuitry of one or more of the devices in FIG. 2) an additional output from the additional machine learning model. For example, the system may receive a second output from the second machine learning model. The system may then use this output (in its native form or after further processing) to generate a prediction.

At step 708, process 700 generates (e.g., by control circuitry of one or more of the devices in FIG. 2) for display a predicted communication success rate for the first pending communication at any time based on the additional output. For example, the system may generate for display, on the user interface (e.g., user interface 100 (FIG. 1)), a predicted communication success rate for the first pending communication at any time (e.g., a success rate if the transmission is sent at any time, at a current time, and/or irrespective of time) based on the additional output.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-4 could be used to perform one or more of the steps in FIG. 7. Additionally or alternatively, one or more steps of process 700 could be switched with and/or combined with one or more steps in FIGS. 5-6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for predicting successful data transmission during mass communications across computer networks featuring disparate entities using machine learning models, the method comprising: receiving, using control circuitry, a first feature input and first times for prediction, wherein the first feature input is based on a record for a first pending communication, wherein the record indicates a communication characteristic, a recipient identifier, and a communication identifier for the first pending communication; inputting, using the control circuitry, the first feature input into a machine learning model, wherein the machine learning model is trained to classify a first subset of feature inputs as corresponding to one of a plurality of predicted communication success rates at given times, wherein each of the first subset of feature inputs corresponds to a respective, previously transmitted communication, wherein each feature input of the first subset of feature inputs is based on a respective record of a plurality of records and a historical network metric that corresponds to a transmission time of the respective record; receiving, using the control circuitry, an output from the machine learning model; and generating for display, on a user interface, a predicted communication success rate for the first pending communication at each of the first times based on the output.

2. The method of embodiment 2, wherein each feature input of the first subset of feature inputs is based on a respective record of the plurality of records and a historical network metric that corresponds to a transmission time of each respective record, and wherein the transmission time of each respective record of each feature input of the first subset of feature inputs corresponds to a first time period.

3. The method of embodiment 3, further comprising: receiving a second feature input, wherein the second feature input is based on the record for the first pending communication; inputting the second feature input into an additional machine learning model, wherein the additional machine learning model is trained to predict a communication success rate at any time, wherein the additional machine learning model comprises: a graph neural network, wherein the graph neural network is trained using historical directed graphs corresponding to the first subset of feature inputs and a second subset of feature inputs, wherein each feature input of the second subset of feature inputs corresponds to a second time period, and wherein the second time period is after the first time period; and a gradient boosting model, wherein the gradient boosting model is trained on outputs of the graph neural network; receiving an additional output from the additional machine learning model; and generating for display, on the user interface, a predicted communication success rate for the first pending communication at any time based on the additional output.

4. The method of embodiment 4, further comprising: receiving, at the user interface, a first user request for the predicted communication success rate for the first pending communication at each of the first times; in response to receiving the first user request, generating the first feature input; receiving, at the user interface, a second user request for the predicted communication success rate for the first pending communication at any time; and in response to receiving the second user request, generating the second feature input.

5. The method of embodiment 3, wherein the machine learning model is validated using a second subset of feature inputs, wherein each feature input of the second subset of feature inputs corresponds to a second time period, and wherein the second time period is after the first time period.

6. The method of embodiment 4, wherein the first feature input corresponds to a third time period, and wherein the third time period is after the second time period.

7. The method of any one of embodiments 1-6, wherein the first feature input includes classes of features based on a rate of successful communications, a number of communications corresponding to the communication identifier, communication characteristic, current operational issued related to the recipient identifier, a number of entities with pending communications, and probabilistic estimations of successful communications related to the recipient identifier.

8. The method of any one of embodiments 1-7, wherein the first feature input includes an engineered feature class that comprises a baseline and moving average rate of pending communications.

9. The method of any one of embodiments 1-8, wherein the machine learning model utilizes a gradient boosting framework that uses tree based learning algorithms.

10. The method of any one of embodiments 1-9, further comprising: determining a feature importance of each feature in the first subset of feature inputs when classifying the first subset of feature inputs as corresponding to one of the plurality of predicted communication success rates by determining a SHAP ("Shapley Additive explanation") value for each feature.

11. A tangible, non-transitory, machine-readable medium storing instructions that, when executed by a data processing apparatus, cause the data processing apparatus to perform operations comprising those of any of embodiments 1-10.

12. A system comprising: one or more processors and memory storing instructions that, when executed by the processors, cause the processors to effectuate operations comprising those of any of embodiments 1-10.

13. A system comprising means for performing any of embodiments 1-10.

What is claimed is:

1. A system for predicting successful data transmission during mass communications across computer networks featuring disparate entities and imbalanced data sets using machine learning models, the system comprising:
cloud-based storage circuitry configured to store:
a database comprising a plurality of records, wherein each record of the plurality of records corresponds to a respective, previously transmitted communication, wherein each record is organized according to a respective transmission time of a plurality of transmission times, and wherein each of the plurality of records indicates a communication characteristic, a recipient identifier, and a communication identifier;
a database of historical network metrics for each of the plurality of transmission times;
a first subset of feature inputs, wherein each feature input of the first subset of feature inputs is based on a respective record of the plurality of records and a historical network metric of the historical network metrics that corresponds to a transmission time of each respective record, and wherein the transmission time of each respective record of each feature input of the first subset of feature inputs corresponds to a first time period;
a machine learning model:
wherein the machine learning model is trained to classify the first subset of feature inputs as corresponding to one of a plurality of predicted communication success rates at given times, wherein each feature input of the first subset of feature inputs is based on a respective record of the plurality of records, and a historical network metric of the historical network metrics that corresponds to a transmission time of the respective record; and
wherein the machine learning model is validated using a second subset of feature inputs, wherein each feature input of the second subset of feature inputs corresponds to a second time period, and wherein the second time period is after the first time period;
cloud-based control circuitry configured to:
receive a first feature input and first times for prediction, wherein the first feature input is based on a first pending communication;
input the first feature input into the machine learning model, wherein the first feature input corresponds to a third time period, and wherein the third time period is after the second time period;
receive an output from the machine learning model; and
cloud-based input/output circuitry configured to:
generate for display, on a user interface, a predicted communication success rate for the first pending communication at each of the first times based on the output.

2. A method for predicting successful data transmission during mass communications across computer networks featuring disparate entities and imbalanced data sets using machine learning models, the method comprising:
receiving, using control circuitry, a first feature input and first times for prediction, wherein the first feature input is based on a record for a first pending communication, wherein the record indicates a communication characteristic, a recipient identifier, and a communication identifier for the first pending communication;
inputting, using the control circuitry, the first feature input into a machine learning model, wherein the machine learning model is trained to classify a first subset of feature inputs as corresponding to one of a plurality of predicted communication success rates at given times, wherein each of the first subset of feature inputs corresponds to a respective, previously transmitted communication, wherein each feature input of the first subset of feature inputs is based on a respective record of a plurality of records, and a historical network metric that corresponds to a transmission time of the respective record;

receiving, using the control circuitry, an output from the machine learning model; and generating for display, on a user interface, a predicted communication success rate for the first pending communication at each of the first times based on the output.

3. The method of claim 2, wherein each feature input of the first subset of feature inputs is based on a respective record of the plurality of records, and a historical network metric that corresponds to a transmission time of each respective record, and wherein the transmission time of each respective record of each feature input of the first subset of feature inputs corresponds to a first time period.

4. The method of claim 3, further comprising:
receiving a second feature input, wherein the second feature input is based on the record for the first pending communication;
inputting the second feature input into an additional machine learning model, wherein the additional machine learning model is trained to predict a communication success rate at any time, wherein the additional machine learning model comprises:
a graph neural network, wherein the graph neural network is trained using historical directed graphs corresponding to the first subset of feature inputs, and a second subset of feature inputs, wherein each feature input of the second subset of feature inputs corresponds to a second time period, and wherein the second time period is after the first time period; and
a gradient boosting model, wherein the gradient boosting model is trained on outputs of the graph neural network;
receiving an additional output from the additional machine learning model; and
generating for display, on the user interface, a predicted communication success rate for the first pending communication at any time based on the additional output.

5. The method of claim 4, further comprising:
receiving, at the user interface, a first user request for the predicted communication success rate for the first pending communication at each of the first times;
in response to receiving the first user request, generating the first feature input;
receiving, at the user interface, a second user request for the predicted communication success rate for the first pending communication at any time; and
in response to receiving the second user request, generating the second feature input.

6. The method of claim 3, wherein the machine learning model is validated using a second subset of feature inputs, wherein each feature input of the second subset of feature inputs corresponds to a second time period, and wherein the second time period is after the first time period.

7. The method of claim 4, wherein the first feature input corresponds to a third time period, and wherein the third time period is after the second time period.

8. The method of claim 2, wherein the first feature input includes classes of features based on a rate of successful communications, a number of communications corresponding to the communication identifier, current operational issued related to the recipient identifier, a number of entities with pending communications, and probabilistic estimations of successful communications related to the recipient identifier.

9. The method of claim 2, wherein the first feature input includes an engineered feature class that comprises a baseline and moving average rate of pending communications.

10. The method of claim 2, wherein the machine learning model utilizes a gradient boosting framework that uses tree based learning algorithms.

11. The method of claim 2, further comprising:
determining a feature importance of each feature in the first subset of feature inputs when classifying the first subset of feature inputs as corresponding to one of the plurality of predicted communication success rates by determining a SHAP ("Shapley Additive explanation") value for each feature.

12. A non-transitory, computer-readable medium for predicting successful data transmission during mass communications across computer networks featuring disparate entities and imbalanced data sets using machine learning models, comprising instructions that, when executed by one or more processors, cause operations comprising:
receiving a first feature input and first times for prediction, wherein the first feature input is based on a record for a first pending communication, wherein the record indicates a communication characteristic, a recipient identifier, and a communication identifier for the first pending communication;
inputting the first feature input into a machine learning model, wherein the machine learning model is trained to classify a first subset of feature inputs as corresponding to one of a plurality of predicted communication success rates at given times, wherein each of the first subset of feature inputs corresponds to a respective, previously transmitted communication, wherein each feature input of the first subset of feature inputs is based on a respective record of a plurality of records and a historical network metric that corresponds to a transmission time of the respective record;
receiving an output from the machine learning model; and
generating for display, on a user interface, a predicted communication success rate for the first pending communication at each of the first times based on the output.

13. The non-transitory, computer-readable medium of claim 12, wherein each feature input of the first subset of feature inputs is based on a respective record of the plurality of records and a historical network metric that corresponds to a transmission time of each respective record, and wherein the transmission time of each respective record of each feature input of the first subset of feature inputs corresponds to a first time period.

14. The non-transitory, computer-readable medium of claim 13, wherein the instructions further cause operations comprising:
receiving a second feature input, wherein the second feature input is based on the record for the first pending communication;
inputting the second feature input into an additional machine learning model, wherein the additional machine learning model is trained to predict a communication success rate at any time, wherein the additional machine learning model comprises:
a graph neural network, wherein the graph neural network is trained using historical directed graphs corresponding to the first subset of feature inputs and a second subset of feature inputs, wherein each feature input of the second subset of feature inputs corresponds to a second time period, and wherein the second time period is after the first time period; and a gradient boosting model, wherein the gradient boosting model is trained on outputs of the graph neural network;

receiving an additional output from the additional machine learning model; and generating for display, on the user interface, a predicted communication success rate for the first pending communication at any time based on the additional output.

15. The non-transitory, computer-readable medium of claim 14, wherein the instructions further cause operations comprising:

receiving, at the user interface, a first user request for the predicted communication success rate for the first pending communication at each of the first times;

in response to receiving the first user request, generating the first feature input;

receiving, at the user interface, a second user request for the predicted communication success rate for the first pending communication at any time; and in response to receiving the second user request, generating the second feature input.

16. The non-transitory, computer-readable medium of claim 13, wherein the machine learning model is validated using a second subset of feature inputs, wherein each feature input of the second subset of feature inputs corresponds to a second time period, and wherein the second time period is after the first time period.

17. The non-transitory, computer-readable medium of claim 16, wherein the first feature input corresponds to a third time period, and wherein the third time period is after the second time period.

18. The non-transitory, computer-readable medium of claim 12, wherein the first feature input includes classes of features based on a rate of successful communications, a number of communications corresponding to the communication identifier, current operational issued related to the recipient identifier, a number of entities with pending communications, and probabilistic estimations of successful communications related to the recipient identifier.

19. The non-transitory, computer-readable medium of claim 12, wherein the machine learning model utilizes a gradient boosting framework that uses tree based learning algorithms.

20. The non-transitory, computer-readable medium of claim 12, wherein the instructions further cause operations comprising:

determining a feature importance of each feature in the first subset of feature inputs when classifying the first subset of feature inputs as corresponding to one of the plurality of predicted communication success rates by determining a SHAP ("Shapley Additive explanation") value for each feature.

* * * * *